(12) United States Patent
Ejiri et al.

(10) Patent No.: US 6,372,325 B1
(45) Date of Patent: Apr. 16, 2002

(54) MAGNETIC RECORDING MEDIUM

(75) Inventors: Kiyomi Ejiri; Koji Naoe; Masatoshi Takahashi, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/524,757

(22) Filed: Mar. 13, 2000

(30) Foreign Application Priority Data

Mar. 12, 1999 (JP) .............................. 11-066038

(51) Int. Cl.$^7$ ................................ G11B 5/68

(52) U.S. Cl. .................. 428/141; 428/694 BR; 428/694 SG; 428/900

(58) Field of Search .................. 428/141, 694 BR, 428/694 SG, 900

(56) References Cited

U.S. PATENT DOCUMENTS 5,496,607 A    3/1996  Inaba et al. ................ 428/65.3
6,017,605 A1 *  1/2001  Yamazaki et al. ......... 428/65.3

* cited by examiner

*Primary Examiner*—Stevan A. Resan
(74) *Attorney, Agent, or Firm*—Sughrue Mion, PLLC

(57) ABSTRACT

Disclosed is a magnetic recording medium having a flexible nonmagnetic support, a nonmagnetic layer containing a nonmagnetic powder and a binder on the support, and a magnetic layer containing a ferromagnetic powder and a binder. The magnetic layer has an average thickness d of 0.01 to 0.3 µm, a ratio σ/d of a standard deviation σ in the thickness of the magnetic layer to the average thickness d equal to or less than 0.5, and, according to the roughness spectrum of a magnetic layer surface measured with an atomic force microscope, a PSD of 0.5 nm$^2$ or lower in a wavelength of 1 to 5 µm and a PSD of 0.02 to 0.5 nm$^2$ in a wavelength of 0.5 µm or more to less than 1 µm.

6 Claims, 1 Drawing Sheet

MAGNETIC RECORDING MEDIUM

BACKGROUND OF THE INVENTION

1. Field of the Invention

This invention relates to a magnetic recording medium suitable for high-density magnetic recording, especially for reproducing in use of a magnetoresistive head(MR head).

2. Description of Related Art

In recent years, a recording wavelength tends to be shorter along with high densification, and if the thickness of the magnetic layer is thick, the output tends to be lowered, thereby raising problems in a self-demagnetization loss during recording and a thickness loss during reproducing. Therefore, a magnetic layer is tried to be thinner, but the influence of a nonmagnetic support may easily appear on the surface of the magnetic layer when the magnetic layer of 2 $\mu$m or less is directly applied to a support, and a deteriorating tendency in an electromagnetic characteristics or dropouts may be seen.

As a means to solve such problems, there is a method for forming, by using a simultaneous multiplayer coating technique, a nonmagnetic layer on a support and a magnetic layer on the nonmagnetic layer, thereby coating high concentration magnetic coating liquid with a thin thickness as disclosed in Japanese Unexamined Patent Publication (KOKAI) Showa No. 63-191,315 and U.S. Pat. No. 4,863, 793. With these inventions, production yields were remarkably improved, and good electromagnetic characteristics were gained. However, a recording and reproducing system with a further narrowed track width has been developed to additionally enhance a recording density. In response to this, it has been proposed that reproduction is made by using a high-sensitive MR head, which has been put to practical use in a hard disk or the like. In a flexible magnetic recording medium such as a magnetic tape, the recording density can be theoretically improved by using the MR head. Even though an output is sufficiently high in conventional magnetic recording media, noise is high and a good C/N is not always gained when the MR head is used. Generally, the surface roughness is reduced to gain a good C/N, but such reduction also causes running stability of the medium to be degraded due to an enlarged contacting area with fixing members such as tape guides or the like used in a magnetic tape path in the recording and reproducing apparatus.

SUMMARY OF THE INVENTION

It is an object of the present invention to provide a magnetic recording medium showing a high C/N during high-density magnetic recording and having superior running stability.

The inventors have diligently researched structures of magnetic layers and nonmagnetic layers, and surface roughness of the magnetic layer to accomplish the above object. Consequently, they have found out that the above object could be accomplished by a magnetic recording medium comprising a flexible nonmagnetic support, a nonmagnetic layer containing nonmagnetic powders and a binder formed on the flexible nonmagnetic support, and a magnetic layer containing a ferromagnetic powder and a binder formed on the nonmagnetic layer, wherein the magnetic layer having an average thickness d of 0.01 $\mu$m to 0.3 $\mu$m, a ratio $\sigma$/d of a standard deviation $\sigma$ of the thickness of the magnetic layer to the average thickness d equal to or less than 0.5, and, according to a roughness spectrum of the magnetic layer surface measured with an atomic force microscope, Power Spectrum Density of a roughness (PSD) of 0.5 nm$^2$ or lower in a wavelength of 1 to 5 $\mu$m , and PSD from 0.02 to 0.5 nm$^2$ in a wavelength of 0.5 $\mu$m or higher to 1 $\mu$m or less.

In the magnetic recording medium according to the invention, it is preferable to set that a coercive force Hc in an in-plane direction of the magnetic layer is 1500 Oe or higher to 4000 Oe or less and that residual magnetization in the in-plane direction per 1 cm$^2$ of the magnetic layer is 0.0005 emu to 0.005 emu.

In the magnetic recording medium according to the invention, it is preferable that a surface roughness spectrum, measured with an atomic force microscope, on the magnetic layer side of the flexible nonmagnetic support has a roughness component strength of 0.5 nm$^2$ or lower in a wavelength of 1 $\mu$m to 5 $\mu$m and PSD of 0.02 nm$^2$ to 0.5 nm$^2$ in a wavelength of 0.5 $\mu$m or higher to less than 1 $\mu$m.

In the magnetic recording medium according to the invention, it is preferable that binder weight B(L) of the nonmagnetic layer is 5 parts or more to 25 parts or lower by weight, with respect to 100 parts by weight of nonmagnetic powders, and that the ratio of the B(L) to binder weight B(U) of the magnetic layer is 0.1<B(U)/B(L)≦1.0.

BRIEF DESCRIPTION OF THE DRAWING

The above and other objects and features of the invention are apparent to those skilled in the art from the following preferred embodiments thereof when considered in conjunction with the accompanied drawing, in which.

DESCRIPTION OF PREFERRED EMBODIMENTS

Figure 1:
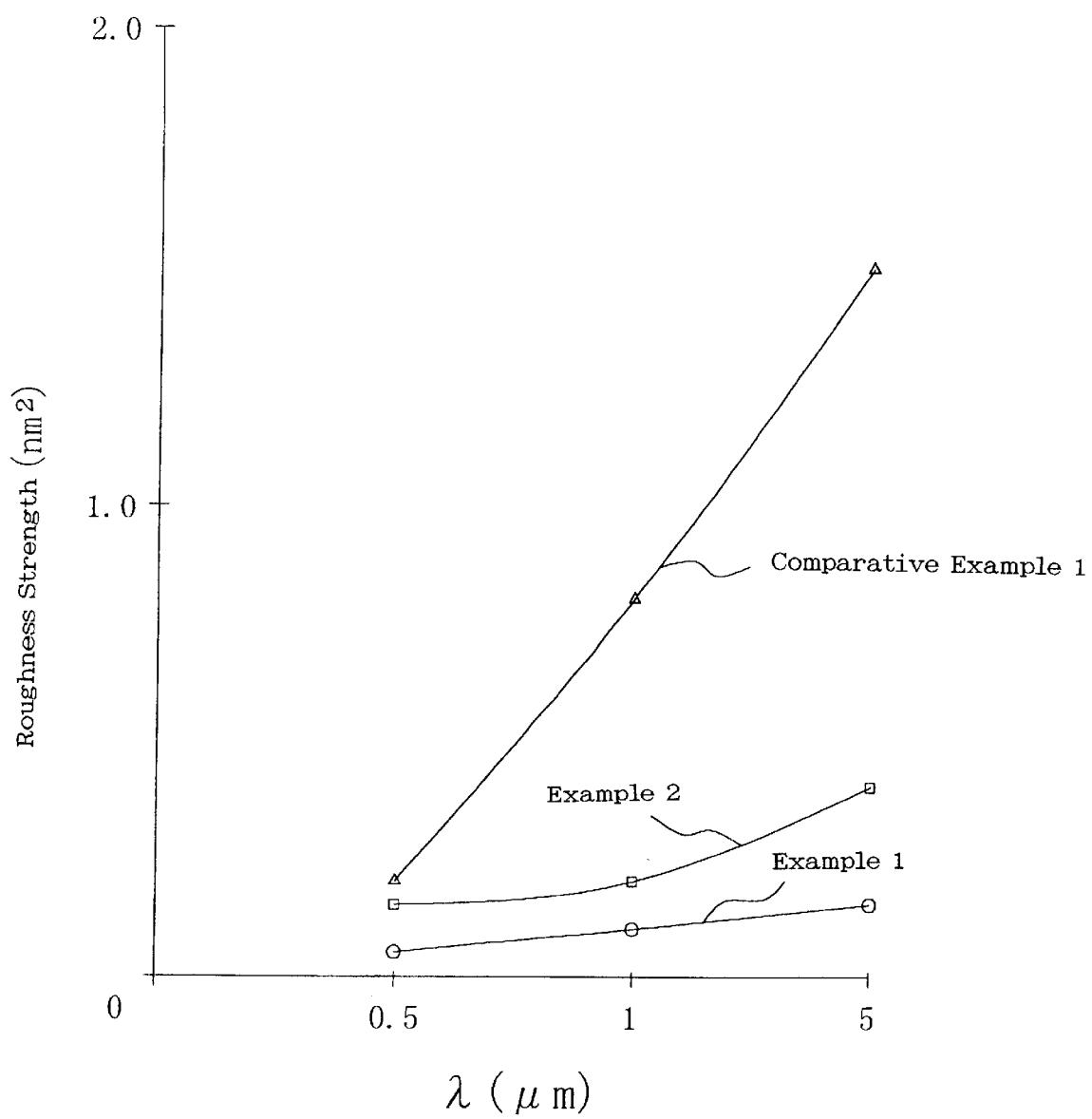
FIG. 1 is a relation between the roughness strength of the magnetic layer surface of the magnetic tapes and wavelength used in Example 1, Example 2, and Comparative Example 1.

In the magnetic recording medium according to the invention, one of features is that the average thickness d of the magnetic layer is 0.01 $\mu$m to 0.3 $\mu$m and the ratio $\sigma$/d of the standard deviation a in the thickness of the magnetic layer to the average thickness d is equal to or less than 0.5.

When a conventional magnetic inductive head is used for recording and reproducing, if the magnetic layer is made to be thin as mentioned above, a magnetization amount is smaller, resulting in that an output for reproduction is lowered. When the MR head is used for reproduction, however, sensitivity is sufficiently high, thereby obtaining a sufficient output and enhancing a resolution property having an advantage in the thin magnetic layer. In other words, by making an average thickness d of the magnetic layer 0.01 $\mu$m or more, required magnetism is secured, and by making an average thickness less than 0.3 $\mu$m, a resolution property can be enhanced, thus improving C/N with the MR head. Especially, the average thickness d of the magnetic layer is preferably set in a range from 0.01 $\mu$m to 0.2 $\mu$m, and more preferably from 0.01 $\mu$m to 0.1 $\mu$m from the viewpoint of an improvement in C/N with the MR head.

On the other hand, the thickness fluctuation of the magnetic layer directly causes noises since using such a thin magnetic layer as mentioned above results in the saturation record. Consequently, it is desirable to have no thickness fluctuation of the magnetic layer, but noises can be reduced to a certain degree in which the noises are tolerable in practical use by making that the ratio $\sigma$/d (the standard deviation $\sigma$ in the thickness of the magnetic layer to the thickness d) is equal to or less than 0.5. From the viewpoint of further noise reduction, the ratio σ/d is preferably equal to or less than 0.3.

As a concrete means to decrease σ, for example, (1) a nonmagnetic layer coating liquid is made to be thixotropic, (2) acicular nonmagnetic powders are used in a nonmagnetic layer, (3) wet on dry technique is used in which a magnetic layer is coated after coating and drying a nonmagnetic layer, or the else as described in U.S. Pat. No. 5,496,607. Furthermore, a ratio σ/d equal to or less than 0.5 can be set by prescribing a binder amount in the nonmagnetic layer and a binder amount in the magnetic layer described later.

As another features of the magnetic recording medium according to the invention, a roughness component strength in a wavelength of 1 to 5 μm, according to the roughness spectrum of the magnetic layer surface measured with an atomic force microscope is 0.5 nm² or less and PSD in a wavelength of 0.5 μm or higher to less than 1 μm is from 0.02 to 0.5 nm².

When surface roughness of the magnetic layer is measured with an atomic force microscope, the wavelength and strength of the roughness can be obtained. A roughness spectrum indicates changes in strength in a wavelength region of the specified roughness. In the magnetic layer surface of the magnetic recording medium according to the invention, PSD in a wavelength of 1 μm to 5 μm is 0.5 nm² or less. By setting like this, amplitude modulation noises during reproduction or thermal asperity during the use of the MR head is reduced, and as a result, enhancement of ratio of C/N can be achieved. PSD in a wavelength of 1 μm to 5 μm is preferably set in 0.3 nm² or less, and more preferably 0.15 nm² or less. In addition, PSD in a wavelength of 0.5 μm or higher to less than 1 μm 0.02 nm² to 0.5 nm². By setting like this, coefficient of friction can be lower. PSD in a wavelength of 0.5 μm or higher to less than 1 μm is preferably 0.05 to 0.3 nm².

Controlling the surface roughness of the magnetic layer is made by, for example, controlling the surface of the nonmagnetic support. In other words, the shape of the magnetic layer surface can be controlled by controlling respectively the roughness component strength in a wavelength of 1 to 5 μm and the roughness component strength in a wavelength of 0.5 μ or higher to less than 1 μm of the surface of the nonmagnetic support to be coated with the magnetic layer.

The shape of the nonmagnetic support surface to be coated with the magnetic layer can be controlled either by dispersing particles substantially equal in size into the resin which is a component of the support (fillers internally added) beforehand, thereby controlling the shape by the particle size and the filling density when coats are produced, or by making the resin having no or less amount of fillers to be added, thereby, after production of coats, controlling the shape by forming the layers of binders in which the micro particles of fillers are dispersed.

In addition, in the magnetic recording medium according to the invention, it is preferably set that coercive force Hc in the in-plane direction of the magnetic layer is 1500 Oe or higher to 4000 Oe or less and that residual magnetization per 1 cm² of the magnetic layer in the in-plane direction is 0.0005 emu to 0.005 emu. This decreases excessive magnetization, and therefore, noises can be further reduced and resolution property can be enhanced. The coercive force Hc in the in-plane direction of the magnetic layer is preferably 1800 Oe to 3500 Oe, and more preferably 2000 Oe to 3000 Oe. The coercive force Hc in the in-plane direction of the magnetic layer can be accordingly changed by adjusting Hc of the ferromagnetic powder contained in the magnetic layer. In addition, the residual magnetization per 1 cm² of magnetic layer in the in-plane direction is accordingly optimized depending on recording and reproducing methods. There are many methods for setting the amount of residual magnetization as mentioned above. For instance, it is appropriate to set a larger amount within the range of the residual magnetization mentioned above when this medium is reproduced with the conventional inductive head. When the magnetic layer is set as to be thinner, e.g., 0.1 μm or less in view of the required overwrite (O/W) properties, alloy powders having large σs, e.g., from 140 emu/g to 160 emu/g are preferably used as magnetic powder. On the other hand, when reproducing is made with the MR head, it is appropriate to increase the number of particles and set the amount of the residual magnetization in the mentioned range smaller. In this case, it is appropriate to enhance the filling density as much as possible by, for example, decreasing the binder amount in the magnetic layer and nonmagnetic layer with the use of the magnetic powder having σs of 50 to 130 emu/g. As ferromagnetic powder to be used, alloy powder having σs of 100 emu/g to 130 emu/g, or hexagonal ferrite, magnetite, cobalt-ferrite or the like having σs of 50 emu/g to 80 emu/g, for example, can be exemplified. In the magnetic recording medium of the invention, the nonmagnetic layer containing nonmagnetic powder and the binder is formed on the flexible nonmagnetic support, and the magnetic layer containing a ferromagnetic powder and the binder is formed on the nonmagnetic layer. The materials or the like for making up of the magnetic layer, the nonmagnetic layer and the flexible nonmagnetic support are sequentially explained as follows.

Magnetic Layer

In the magnetic recording medium of the invention, the object of the invention can be accomplished with either single or multiple magnetic layers. In the case of multiple magnetic layers, for example, art disclosed in U.S. Pat. No. 5,447,782 can be applied.

Magnetic Powder

In the magnetic recording medium of the invention, an average thickness d of the magnetic layer is 0.01 μm to 0.3 μm. Therefore, it is preferable to use such ferromagnetic powder contained in the magnetic layer as those possible to render the average thickness of the magnetic layer in the range mentioned above, and to make the size of magnetic particles so small in the range as not suffering from thermal fluctuation. Practically, in the case of acicular particles, it is appropriate to use the particles having a mean length of major axis of 0.05 μm to 0.2 μm and a diameter of minor axis of 0.01 μm to 0.025 μm. In addition, it is appropriate to use the hexagonal ferrite having a plate size of 0.01 μm to 0.2 μm and a thickness of 0.001 μm to 0.1 μm. Other than the ferromagnetic powder mentioned above, the powder of further smaller particles can be used.

As for the magnetic powder contained in the magnetic layer, used are such ferromagnetic alloy micro powder as γ-FeO$_x$(x=1.33 to 1.5), Co modified γ-FeO$_x$(x=1.33 to 1.5), or those having Fe, Ni or Co as the main component (75% or higher), and publicly known ferromagnetic powder such as barium ferrite, strontium ferrite or the like, but it is more preferable to use ferromagnetic alloy micro powder having α-Fe as the main component and the hexagonal ferrite such as barium ferrite.

Those ferromagnetic powders may contain atoms, other than the prescribed atoms, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Mn, Zn, Sr, B and so on. The atoms such as Al, Si, Ta, or Y, or solid solution thereof can be coated on the surface to improve the thermal stability. It is well known that Co, Sm, Nd or the like is added 5% to 40% by weight to Fe so as to enhance Hc in especial.

Prior to dispersion, the ferromagnetic powder may be treated with, for example, a dispersant, a lubricant, a surfactant, or an antistatic agent as described later.

Among the above ferromagnetic powder, the ferromagnetic alloy powder may contain a small amount of hydroxides or oxides. Usable are the ferromagnetic alloy powder obtained from known manufacturing methods, and the following methods can be exemplified: a method for reduction with composite organic acid salt (oxalate, mainly) and reductive gas such as hydrogen; a method for obtaining Fe or Fe—Co particles by reducing iron oxide with reductive gas such as hydrogen; a method for thermally decomposing metal carbonyl compounds; a method for reducing a material by adding reducing agents such as sodium boron hydride, hypophosphite, or hydrazine to ferromagnetic metal solution; and a method for obtaining powder by evaporating metals in low-pressure inert gas.

The ferromagnetic alloy powder thus obtained are subjected to any of the publicly known slow oxidation treatment methods, that is, a method of dipping the powder in an organic solvent and then drying the powder, a method of dipping the powder in an organic solvent and feeding an oxygen-containing gas to form an oxide film on the surface of the powder and then drying the powder, and a method of adjusting the partial pressures of an oxygen gas and an inert gas without using an organic solvent, thereby forming an oxide film on the surface of the powder. The last method is the most preferable.

The ferromagnetic powder in the magnetic layer of the invention are described, as a specific surface area, by the BET method, of 25 to 80 m$^2$/g, preferably 40 to 70 m$^2$/g. It is not preferable to have the specific surface area of 25 m$^2$/g or less since noises are increased, or 80 m$^2$/g or higher since good surface property is hardly obtained respectively. The crystallite size of the ferromagnetic powder in the magnetic layer of the invention is set as 250 to 100 angstroms, preferably 200 to 100 angstroms. The σs of the iron oxide magnetic powder is 50 emu/g or higher, and preferably 70 emu/g or higher, and the σs of the ferromagnetic metal powder is preferably 100 emu/g or higher. The coercive force is preferably set as 1500 Oe or higher and 4000 Oe or less, more preferably, 2000 Oe or higher and 3000 or less. The acicular ratio of the ferromagnetic powder is 18 or less, preferably, 12 or less.

The moisture content of the ferromagnetic powder is preferably 0.01 to 2% by weight, and the moisture content is preferably optimized depending on the kinds of the binders. The tap density of the γ iron oxide is preferably 0.5 g/ml or higher, more preferably, 0.8 g/ml or higher. The tap density of the alloy powder is preferably 0.2 to 0.8 g/ml, and if the powder with the tap density of 0.8 g/ml or higher are used, oxidation may be promoted during the compressing process of the ferromagnetic powder, and it may become difficult to obtain an adequate σs. The tap density of 0.2 g/ml or less may cause inadequate dispersions.

The ferromagnetic powder used in the invention preferably have fewer voids, and an amount of the voids of the ferromagnetic powder is 20 volume % or less, more preferably 5 volume % or less. A shape of the ferromagnetic powder is preferably any of an acicular, a particle, a rice grain (in other words, spindle-shaped), or a plate shape as far as it satisfies the aforementioned characteristics related to the particle size. In the case of the acicular or the spindle-shaped ferromagnetic powder, the acicular rate is preferably 12 or less. To achieve the SFD (Switching Field Distribution) of 0.6 or lower in the ferromagnetic powder, the HC distribution of the ferromagnetic powder is required to be narrower. The methods for narrowing the Hc distribution of the ferromagnetic powder includes a method of improving the particle size distribution of goethite, a method of preventing γ-hematite from sintering, a method of making the depositing speed of cobalt slower than a conventional method with respect to iron oxide with cobalt modification, or the other methods.

The invention can use, as a plate-shape hexagonal ferrite, each substitution product of the barium ferrite, strontium ferrite, lead ferrite or calcium ferrite; Co substitution product or the else; and hexagonal Co powder, specifically such as the magnetoplumbate barium ferrite as well as strontium ferrite, and those magnetoplumbate barium ferrite as well as strontium ferrite containing partially a spinel phase. Among those, especially preferable is each Co substitution product of barium ferrite or strontium ferrite. In addition, the above hexagonal ferrite with elements such as Co—Ti, Co—Ti—Zr, Co—Ti—Zn, Ni—Ti—Zn, or Ir—Zn as an additive can be used to control the coercive force. The hexagonal ferrite is usually a hexagon plate-shape particle, and the diameter of the particle refers to a plate width of the hexagon plate-shape particle, measured with an electron microscope.

In the invention, the diameter of the particle is prescribed as in a range of 0.01 to 0.2 μm, more preferably, in a range of 0.03 to 0.1 μm. The average thickness (plate thickness) of the particles is around 0.001 to 0.1 μm, but preferably, 0.003 to 0.05 μm. The plate-form ratio (particle diameter/plate thickness) is 1 to 10, preferably, 3 to 7, and the specific surface area measured by BET method (SBET) of those hexagonal ferrite powder is preferably 25 to 70 m$^2$/g.

Binder

As for the binder used in the magnetic layer, publicly known binders, for example, disclosed in Japanese Patent Nos. 2,566,096 and 2,571,351 can be accordingly used, and especially, vinyl chloride resins described in U.S. Pat. No. 4,707,411 and polyurethane resins described in U.S. Pat. Nos.5,702,821; 5,795,645; 5,415,941 and 4,152,485 are preferred. It is preferable for those binders to have a functional group (SO$_3$M, PO$_3$M or the like) promoting adsorption to the magnetic powders, and also preferable to have epoxy groups. It is adequate to set that the molecular weight is 10000 to 100000, and preferably, 20000 to 60000. As for the amount to be used, it is adequate to make it 5 to 25 parts by weight, per 100 parts by weight of the magnetic powders, and preferably, 5 to 20 parts by weight, and more preferably, 5 to 15 parts by weight.

The magnetic layer may contain known abrasives, for example, α-alumina, Cr$_2$O$_3$ or the like. The average particle size is preferably one third or more to fifth times or less of the thickness of the magnetic layer in the case of wet-on-wet coating, and one third or more to twice or less of the thickness of the magnetic layer in the case of wet-on-dry coating. Excessively large size particles may cause thermal asperity. The micro particles are preferred because the abrasives tend to be projections especially in the wet-on-dry coating. Known technologies can be suitably used for the pH adjustment and the surface treatment.

Other than the mentioned above, solid lubricants (carbon having a particle size of 30 μm or larger) or liquid lubricants such as fatty acids or fatty acid esters can be accordingly added to the magnetic layer.

Nonmagnetic Layer

With respect to the nonmagnetic powder used in the nonmagnetic layer, the known nonmagnetic powder can be used suitably, for example, those exemplified in Japanese Pat. No. 2,571,351 and U.S. Pat. No. 5,496,607. Specifically, especially preferable in the invention as nonmagnetic powder, are acicular metal oxides having pH 5 or higher, and those are highly adsorptive to the functional groups, thus providing good dispersion with few binders and high mechanical strength for coating films. In addition, it is characterized in that thixotropic property in a coating liquid required in the invention is easily obtained owing to its configuration effect. The particle might have the size described in the mentioned publication, but smaller size is more preferable.

As other favorable conditions of the nonmagnetic powder, it is adequate to have an oil adsorbing amount, using DBP, of 5 to 100 ml/100 g, preferably, 10 to 80 ml/100 g, and more preferably, 20 to 60 ml/100 g, and the specific gravity of 1 to 12, preferably, 3 to 6. The shape can be any of acicular, sphere, polygon, and plate. The ignition loss is preferably 20% by weight or less.

Inorganic powder used as nonmagnetic powder of the invention are preferably 4 or higher on the Mohs' scale. The roughness factor of the powder surface is preferably 0.8 to 1.5, and more preferably, 0.9 to 1.2. It is adequate to set that the adsorption amount of stearic acid (SA) is 1 to 20 $\mu mol/m^2$, preferably, 2 to 15 $\mu mol/m^2$. The wetting heat to water at 25° C. in the nonmagnetic powder of the nonmagnetic layer is preferably in a range of 200 erg/cm² to 600 erg/cm². Also, a solvent having a wetting heat in this range can be used. Water molecule weight at a surface at 100 to 400° C. is 1 to 10 pieces/100 angstroms.

The pH at the isoelectric point in water is preferably between 5 and 10.

The powder is preferably surface-treated so that at least a part of the surface is covered with $Al_2O_3$, $SiO_2$, $TiO_2$, $ZrO_2$, $SnO_2$, $Sb_2O_3$, or ZnO; in respect of dispersing property, preferable are $Al_2O_3$, $SiO_2$, $TiO_2$, $ZrO_2$. The surface treatment may be made with two or more combined compounds from above.

The binder to be used may be the same as that of the magnetic layer, but more preferably, the binder containing the functional groups (mentioned above) for improving dispersing property. As described in Japanese Patent Nos. 2,566,088 and 2,634,792, it is more effective to do a surface treatment with an aromatic phosphorus compound promoting the inorganic powder to disperse.

The binder weight B(L) in the nonmagnetic layer is 5 parts or more to 25 parts or less per 100 parts by weight of the nonmagnetic powder as a main component, preferably, 8 parts or more to 20 parts or less, and it is adequate that the ratio of the binder weight B(L) to the binder weight B(U) in the magnetic layer is $0.1 \leq B(U)/B(L) \leq 1.0$, preferably, $0.3 \leq B(U)/B(L) \leq 0.7$. When the B(U) is more than 25 parts, the filling degree of the magnetic layer tends to be lowered. When the B(U)/B(L) is larger than 1, not only the surface roughness is increased, but also the magnetic layer may not be thinly coated in the simultaneous multilayer coating. When it is less than 0.1 (i.e. too small amount of binders), the mechanical strength of the coating film may not be obtained, thereby causing the tendency of powder falling. Furthermore, the ratio for the thickness d of the magnetic layer to the standard deviation $\sigma$ can be easily set to $\sigma/d \leq 0.5$ by prescribing the binder amount in the nonmagnetic layer and the binder amount of the magnetic layer as mentioned above.

The simultaneous multilayer coating of the super thin magnetic layer can be made while suppressing the disorder of the upper nonmagnetic layer interface caused when coated as well as controlling the surface roughness of the magnetic layer, by decreasing the binder amount in the nonmagnetic layer for increasing thixotropic property in the nonmagnetic layer coating liquid, and also by specifying the ratio of the binder amount in the nonmagnetic layer to the binder amount in the magnetic layer. In the case of the simultaneous multilayer coating with the small amount of the binder of the nonmagnetic layer, the migration of the extra binder components to the magnetic layer becomes less, thereby improving the filling degree of the magnetic particles in the magnetic layer and promoting lowering of noises.

By decreasing the binder amount in the nonmagnetic layer, the number of voids in the coating layer is increased, resulting in that the molding by calendering becomes more effective, and therefore, the surface shape of the support is easily reflected to the magnetic layer surface.

It is appropriate to set the thickness of the nonmagnetic layer as, for example, in a range of 0.05 to 2.0 $\mu m$, preferably, 0.1 to 1.5 $\mu m$.

Other than those above, carbon black for the antistatics (particle size of 20 $\mu m$ or smaller), or an abrasive can be added to the nonmagnetic layer. Also, a publicly known lubricant may be added.

In the magnetic layer and the nonmagnetic layer of the magnetic recording medium of the invention, it is preferable to cross-link and cure respective binders by using the following polyisocyanate as one component of the binder.

Usable polyisocyanates are such as: isocyanates such as tolylene diisocyanate, 4-4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; products of these isocyanates with polyalcohols; and polyisocyanates formed through condensation of isocyanates. These isocyanates are commercially available under the following trade names: Coronate L, Coronate HL, Coronate 2030, Coronate 2031, Millionate MR, and Millionate MTL manufactured by Nippon polyurethane Co., Ltd.; Takenate D-102, Takenate D-110N, Takenate D-200, and Takenate D-202 manufactured by Takeda Chemical Industries, Ltd.; and Desmodule L, Desmodule IL, Desmodule N, and Desmodule HL manufactured by Sumitomo Bayer Co.,Ltd. For both the nonmagnetic layer and the magnetic layer, the polyisocyanate may be used alone, or used in combination of two or more by taking advantage of a difference in curing reactivity. In the magnetic layer and the nonmagnetic layer of the magnetic recording medium of the invention, carbon black can be used, for example, furnace black for rubbers, thermal for rubbers, black for coloring, acetylene black or the like. The carbon black preferably has a specific surface area of 5 to 500 m²/g, a DBP oil absorption of 10 to 400 ml/100 g, a particle diameter of 5 to 300 m$\mu$, a pH of 2 to 10, a moisture content of 0.1 to 10% by weight, and a tap density of 0.1 to 1 g/ml. Specific examples of carbon blacks for use in this invention include BLACKPEARLS 2000, 1300, 1000, 900, 800, 700, and VULCAN XC-72 manufactured by Cabot Corporation; #80, #60, #55, #50, and #35 manufactured by Asahi Carbon Co., Ltd.; #2400B, #2300, #900, #1000, #30, #40, and #10B manufactured by Mitsubishi Chemical Corp.; and CONDUCTEX SC, RAVEN 150, 50, 40, and 15 manufactured by manufactured by Columbia Carbon Co. These carbon blacks may be used after surface-treated with a dispersant or another agent or grafted with a resin; also, carbon blacks whose surfaces have been partly graphitized may be used. Further, before added to a magnetic coating liquid, those carbon blacks may be dispersed into the binder. These carbon blacks can be used alone or in combination.

The carbon black is preferably used in an amount of 0.1 to 30% by weight with respect to the amount of ferromagnetic powder.

The carbon black has functions in the magnetic layer for antistatics, for reducing the coefficient of friction, for preventing the light-transmittance, or for improving the strength for coating. Different effects are produced depending on different carbon black. Therefore it is, of course, possible in the present invention to properly use carbon black, according to the purposes, in the magnetic layer and the nonmagnetic layer depending on the mentioned properties such as particle size, oil adsorption, electrical conductivity or pH. As for the examples of the carbon blacks usable in the magnetic layer of the invention, Carbon Black Binran (Carbon Black Handbook) edited by Carbon Black Association, for example, can be referred.

An abrasive can be added to the magnetic layer of the magnetic recording medium of the invention. As the abrasives, known materials mostly having 6 or higher on Mohs' scale can be used alone or in combination; for example, α-alumina having an α-conversion rate of 90% or higher, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. A composite made up of two or more of these abrasives (e.g., one obtained by surface-treating one abrasive with another) may also be used. Although in some cases these abrasives contain compounds or elements other than the main component, it is adequate for the abrasive to have the main component of 90% or higher. The abrasive preferably has a tap density of 0.3 to 2 g/ml, a moisture content rate of 0.1 to 5% by weight, a pH of 2 to 11, and a specific surface area of 1 to 30 m$^2$/g. Although abrasives used in the present invention may have any of acicular, spherical, or cubical form, a particle having a corner or corners on the part of the form is preferred because abrasives of this form have high abrasive property. Specific examples of the abrasive used in the invention are AKP-20, AKP-30, AKP-50, HIT-50, HIT-55, HIT60A, HIT-70 and HIT-100 manufactured by Sumitomo Chemical Co., Ltd.; G5, G7 and S-1 manufactured by Nippon Chemical Industrial Co., Ltd.; and TF-100 and TF-140 made by Toda Kogyo Corp. The abrasive used in the invention may differ in kinds, amounts, and combinations depending on either the magnetic layer (the upper nonmagnetic layer) or the nonmagnetic layer according to the purposes. The abrasive can be added into the magnetic paints after subjecting to a dispersing treatment in advance with the binder.

Those having a lubricating effect, an antistatic effect, a dispersing effect, or a plasticizing effect can be used as additives in the invention. Examples of the additives are molybdenum disulfide, tungsten graphite disulfide, boron nitride, graphite fluoride, silicone oil, silicone having a polar group, fatty acid modified silicone, fluorine-containing silicone, fluorine-containing alcohol, fluorine-containing ester, polyolefin, polyglycol, alkyl phosphoric ester and their alkali metal salt, alkyl sulfuric ester and their alkali metal salt, polyphenyl ether, fluorine-containing alkyl sulfuric ester and their alkali metal salt, monobasic fatty acid having a carbon number of 10 to 24 (possible to contain an unsaturated bond or bonds, or to be branched) and their metal salt (e.g., Li, Na, K, Cu), or monohydric, dihydric, trihydric, tetrahydric, pentahydric, or hexahydric alcohol having a carbon number of 12 to 22 (possible to contain an unsaturated bond or bonds, or to be branched), alkoxyalcohol having a carbon number of 12 to 22, monofatty acid ester, difatty acid ester or trifatty acid ester comprising any one of monobasic fatty acid having a carbon number of 10 to 24 (possible to contain an unsaturated bond or bonds, or to be branched) and monohydric, dihydric, trihydric, tetrahydric, pentahydric, or hexahydric alcohol having a carbon number of 2 to 12 (possible to contain an unsaturated bond or bonds, or to be branched), fatty acid ester of monoalkyl ether of alkylene oxide polymerized product, fatty acid amide having a carbon number of 8 to 22, aliphatic amine having a carbon number of 8 to 22, and so on.

More specific examples of such additives include lauric acid, myristic acid, palmitic acid, stearic acid, behenic acid, butyl stearate, oleic acid, linolic acid, linolenic acid, elaidic acid, octyl stearate, amyl stearate, iso-octyl stearate, octyl myristate, butoxyethyl stearate, anhydrosorbitan monostearate, anhydrosorbitan distearate, anhydrosorbitan tristearate, oleyl alcohol, and lauryl alcohol. Also, those can be used such as nonionic surfactants such as alkylene oxide system, glycerin system, glycidol system, or alkylphenol-ethylene oxide adduct; cationic system surfactant such as cyclic amine, ester amide, quaternary ammonium salt, hydantoin derivative, heterocyclic compound, phosphonium or sulfonium; anionic surfactant containing an acidic group such as carboxylic acid, sulfonic acid, phosphoric acid, sulfuric ester group, or phosphoric ester group; and ampholytic surfactant such as amino acid, aminosulfonic acid, sulfuric or phosphoric ester of aminoalcohol, or alkylbetaine type.

These surfactants are described in detail in "A Guide to Surfactants" (published by Sangyo Tosho Co.). These lubricants, antistatic agents or the like need not be 100% pure, but may contain impure components such as isomers, unreacted substances, side reaction products, degradation products or oxides in addition to the main component. The content of these impurities is preferably 30% or less, and more preferably 10% or less.

The lubricants and the surfactants usable in this invention may differ in kinds and amounts between the magnetic layer and the nonmagnetic layer and can be selectively placed according to the purpose. For example, it is conceivable to control exudation on the surface with use of fatty acids having different melting points between the nonmagnetic layer and the magnetic layer, to control exudation on the surface with use of esters having different boiling points or polarities, to improve the coating stability by adjusting the surfactant amount, and to improve lubricant effects by increasing the additive amount of lubricants in the nonmagnetic layer, and such designing is not limited to the above examples as a matter of course. All or some of the additives used in the invention may be added at any stage of the manufacturing process for the magnetic paint; for example, they may be mixed with the ferromagnetic powders before a kneading step; added at a kneading step for kneading the ferromagnetic powders, the binder, and a solvent; added at a dispersing step; added after dispersing; or added immediately before coating. The object may be accomplished by coating a part or all of the additives by simultaneous or sequential coating, after the magnetic layer is coated according to the purpose. The lubricants may be coated on the surface of the magnetic layer after calender processing or making slits depending on the purpose.

Product examples of the lubricants used in the invention are NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hydrogenated castor oil fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate, and erucic acid manufactured by NOF Corp.; oleic acid manufactured by Kanto chemical Co., Ltd.; FAL-205 and FAL-123 manufactured by Takemoto Oil and Fat Co., Ltd.; Enujerubu LO, Enujerubu IPM, and Sansosyzer E4030 manufactured by New Japanese Chemical Co., Ltd.; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910, and KF-3935 manufactured by Shin-Etsu Chemical Co., Ltd.; Armaid P, Armaid C, and Armoslip CP manufactured by Lion Armour Co.; Duomine TDO manufactured by Lion Corp.; BA-41G manufactured by The Nisshin Oil Mills, Ltd.; Profan 2012E, Newpole PE61, Ionet MS-400, Ionet MO-200Ionet DL-200, Ionet DS-300, and Ionet DS-1000Ionet DO-200 manufactured by Sanyo Chemical Industries, Ltd.

Examples of the organic solvents used in the invention are ketones such as acetone, methyl ethyl ketone, methyl isobutyl ketone, diisobutyl ketone, cyclohexanone, isophorone, or tetrahydrofuran; alcohols such as methanol, ethanol, propanol, butanol, isobutyl alcohol, isopropyl alcohol, or methylcyclohexanol; esters such as methyl acetate, butyl acetate, isobutyl acetate, isopropyl acetate, ethyl lactate or glycol acetate; glycol ether system such as glycol dimethyl ether, glycol monoethyl ether, or dioxane; aromatic hydrocarbons such as benzene, toluene, xylene, cresol or chlorobenzene; chlorinated hydrocarbons such as methylene chloride, ethylene chloride, carbon tetrachloride, chloroform, ethylene chlorohydrin, or dichlorobenzene; N,N-dimethylformamide; and hexane. These organic solvents may be used in arbitrary proportions. These organic solvents need not be 100% pure, but may contain impure components, such as isomers, unreacted substances, side reaction products, degradation products, oxides or moisture, in addition to the main component. The content of those impurities is preferably 30% or less, and more preferably 10% or less. In the invention, the same kinds of organic solvents are desirably used in the magnetic layer and the nonmagnetic layer, and those addition amounts can be changed. It is adequate to raise the stability of coating, in the nonmagnetic layer, using a solvent having a high surface tension, (e.g., cyclohexane, dioxane or the like), for forming the nonmagnetic layer, more specifically, to design that the arithmetic mean value of the magnetic layer solvent compositions is not less than the arithmetic mean value of the nonmagnetic layer solvent compositions. To improve the dispersing property, a solvent having a strong polarity to some extent is preferred, and it is also preferable that the solvent having permittivity of 15 or more is contained 50% or higher in the solvent compositions. The dissolution parameter is preferably 8 to 11.

Flexible Nonmagnetic Support

As the flexible nonmagnetic support used in the invention, usable are, such as, publicly known films of polyesters such as polyethyleneterephthalate or polyethylenenaphthalate, polyolefins, cellulose triacetate, polycarbonate, polyamide, polyimide, polyamideimide, polysulfone, aramid, and aromatic polyamide. These supports may be subjected beforehand to corona discharge treatment, plasma treatment, treatment for enhancing adhesion, heat treatment, or dust removal.

To achieve the object of the invention, it is preferable to use the flexible nonmagnetic support having PSD of 0.5 $nm^2$ or less, preferably, 0.3 $nm^2$ or less, more preferably, 0.15 $nm^2$ or less in a wavelength 1 to 5 $\mu m$ as well as PSD of 0.02 $nm^2$ to 0.5 $nm^{2,}$ preferably, 0.05 to 0.3 $nm^2$ in a wavelength 0.5 $\mu m$ to 1 $\mu m$ according to the surface roughness spectrum measured with an AFM. The surface roughness can be freely controlled by the size and amount of the fillers added to the support. Examples of such fillers include oxides or carbonates of Ca, Si and Ti, as well as organic micro powders of an acryl-based resins or the like.

The F-5 value in the traveling direction of the nonmagnetic support in the invention in the case of a tape is preferably 5 to 50 $kg/mm^2$, while the F-5 value in the width direction is preferably 3 to 30 $kg/mm^2$ in the case of the tape. Generally, the F-5 value in the tape length direction is higher than the F-5 value in the tape width direction, but this is not the case particularly when the strength in the width direction needs to be increased.

The thermal shrinkage of the support in the tape traveling direction and in the tape width direction at 100° C. for 30 minutes is preferably 3% or less, more preferably 1.5% or less; and the shrinkage at 80° C. for 30 minutes is preferably 1% or less, more preferably 0.5% or less. It is preferable that the break strength of the support in the both directions is preferably 5 to 100 $kg/mm^2$ and that the modulus of elasticity is 100 to 2,000 $kg/mm^2$.

As for the thickness structure of the magnetic recording medium of the invention, it is appropriate to set that the flexible nonmagnetic support is, e.g., 1 to 100 $\mu m$, preferably, 4 to 80 $\mu m$. The total thickness in combination of the magnetic layer and the nonmagnetic layer is properly set in a range of one hundredth to twice of the thickness of the flexible nonmagnetic support. In addition, an undercoat layer may be provided in order to improve adhesion between the flexible nonmagnetic support and the nonmagnetic layer. The thickness of the undercoat layer is, for example, 0.01 to 2 $\mu m$, preferably 0.02 to 1.5 $\mu m$. On the side of the nonmagnetic support opposite to the magnetic layer side, a back-coat layer may be provided. It is appropriate to set that the thickness of the back-coat layer is for example, 0.1 to 2 $\mu m$, preferably 0.3 to 1.0 $\mu m$. The components for use in the undercoat layer and the back-coat layer may be publicly known ones.

The magnetic recording medium of the invention can be manufactured by coating a paint for nonmagnetic layer and a paint for the magnetic layer.

The process for producing the paints for the nonmagnetic layer and the magnetic layer at least comprises steps of a kneading step, a dispersing step, and a mixing step to be carried out, if necessary, before or after these steps. The individual step may be performed separately at two or more stages. All of the starting materials to be used in the invention, including the ferromagnetic powder, binder, carbon black, abrasive, antistatic agent, lubricant and solvent, may be added at the beginning of or during any of the steps. Furthermore, the individual starting material may be divided and added in two or more steps; for example, polyurethane may be divided and added in the kneading step, the dispersing step, and the mixing step for viscosity adjustment after dispersing.

Although in the manufacturing process, conventionally known manufacturing technique can be used as a part of the process to achieve the object of the invention as a matter of course, a continuous kneader or a pressure kneader having a strong kneading power can be used in the kneading step. With the use of these kneaders, a magnetic recording medium having a high residual magnetic flux density (Br) can be obtained. When the continuous kneader or pressure kneader is used, the ferromagnetic powders and all or part of the binder (preferably, not less than 30% of the entire binder) are kneaded in a range of 15 to 500 parts by weight, with respect to 100 parts by weight of the ferromagnetic powders. Details of the kneading treatment are set forth in U.S. Pat. Nos.4,946,615 and 5,300,244. When the nonmagnetic layer coating liquid is prepared, dispersing media having a high specific gravity may be used, desirably, zirconia beads.

The followings can be applied as coating apparatuses and methods for producing multilayer magnetic recording media such as that of the present invention.

1. A nonmagnetic layer is first applied with a coating apparatus commonly used for magnetic paint coating, e.g., a gravure coating, roller coating, blade coating, or extrusion coating apparatus, and a magnetic layer is then applied, while the nonmagnetic layer is still in a wet state, by means of a support-pressing extrusion coating apparatus such as those disclosed in U.S. Pat. Nos.4,480,583; 4,681,062; and 5,302,206.

2. An upper nonmagnetic layer is applied almost simultaneously using a single coating head having two built-in slits for passing coating liquids, such as those disclosed in U.S. Pat. Nos.4,854,262; 5,072,688; and 5,302,206.

3. An upper nonmagnetic layer is applied almost simultaneously using an extrusion coating apparatus with a backup roller as disclosed in Japanese Unexamined Patent Publication (KOKAI) Heisei No. 2-174965

In order to prevent lowering the electromagnetic characteristics or the like of the magnetic recording medium due to aggregation of magnetic particles, shearing may preferably apply to the coating liquid in the coating head by a method such as those disclosed in U.S. Pat. No. 4,828,779 and Japanese unexamined Patent Publication (KOKAI) Heisei No. 1-236,968. In addition, the viscosity of the coating liquid needs to satisfy the numerical range as specified in U.S. Pat. No. 4,994,306. To obtain the magnetic recording medium of the invention, a strong orientation is required to be made. It is preferable to concurrently use a solenoid of 1000 G or higher and a cobalt-rare earth metal magnet of 2000 G or higher in a manner that the same polarities of those above oppose to each other, and furthermore, it is preferable to set a proper drying step in advance before the orientation so that the post-dry orientation characteristics show the highest. When this invention applies to a disc medium, an orientation method rather to randomize the orientation is required. To change the orientation direction of the magnetic layer and the nonmagnetic layer, the orientation direction is not necessary to be in an in-plane, longitudinal direction, but it can be in a vertical or widthwise direction.

Heat-resistant plastic rollers made of, e.g., epoxy, polyimide, polyamide, or polyimideamide, can be used as rollers for calendering process, or metal rollers by themselves can also be used. The processing temperature is preferably at 70° C. or higher, more preferably at 80° C. or higher. The linear pressure is preferably 200 kg/cm or higher, more preferably 300 kg/cm or higher. The coefficient of friction of the magnetic layer surface and the opposite side surface of the magnetic recording medium of the invention with respect to the SUS420J is preferably, 0.5 or less, more preferably 0.3 or less; the surface resistivity is preferably from $10^4$ to $10^{12}$ Ω/sq; the modulus of elasticity at 0.5% elongation of the magnetic layer is preferably from 100 to 2,000 kg/mm² in both the running and width directions; the strength at break is preferably from 1 to 30 kg/cm²; the modulus of elasticity of the magnetic recording medium is preferably from 100 to 1,500 kg/mm² in both running and longitudinal directions; the residual elongation is preferably 0.5% or less; the thermal shrinkage at any temperature of 100° C. or below is preferably 1% or less, more preferably 0.5% or less, and the most preferably 0.1% or less. The glass transition temperature (the temperature at which the loss elastic modulus in a dynamic viscoelasticity measurement at 110 Hz becomes maximum) of the magnetic layer is preferably 50° C. or higher to 120° C. or below, while that of the nonmagnetic layer is preferably at 0° C. to 100° C. The loss elastic modulus is preferably in a range from $1\times10^8$ to $8\times10^9$ dyne/cm²; the loss tangent is preferably 0.2 or less. If the loss tangent is too large, sticking troubles tend to come out.

The residual solvent contained in the magnetic layer is preferably 100 mg/m² or less, more preferably 10 mg/m² or less, and the residual solvent contained in the second layer is preferably lower than that in the first layer. The void percentage in the magnetic layer is preferably 30% by volume or less in the both nonmagnetic and magnetic layers, and more preferably 20% by volume or less. Although a lower void percentage is preferable for attaining higher output, there are some cases in which a certain degree of void percentage is preferred according to the purposes; for example, in the case of a magnetic recording medium for data recording advantageous for repetitive use, higher void percentage in most cases brings about better running durability. The magnetic property of the magnetic recording medium of the invention has, when measured in a magnetic field of 5 kOe, a squareness of 0.70 or higher, preferably, 0.80 or higher, more preferably, 0.90 or higher in the tape traveling direction.

The squareness in two directions perpendicular to the tape traveling direction is preferably 80% or less of the squareness in the traveling direction. The SFD (Switching Field Distribution) of the magnetic layer is preferably 0.6 or less.

With the magnetic recording medium of the invention, which has the nonmagnetic layer and the magnetic layer, it is easily presumed that the magnetic recording medium can be made to have a difference in physical properties between the nonmagnetic layer and the magnetic layer according to the purposes. For example, the magnetic layer is made to have a high modulus to improve running durability while the nonmagnetic layer is made to have a lower modulus than that of the magnetic layer to have better head touching of the magnetic recording medium. Techniques relating to known multilayer magnetic layers can be refer to when designing physical characteristics of two or more magnetic layers. For example, although there are many inventions as disclosed in Japanese Patent Publication (KOKOKU) Showa No. 37-2, 218 and Japanese Unexamined Patent Publication (KOKAI) Showa No. 58-56,228 in which the Hc of the magnetic layer is set higher than that of the nonmagnetic layer, recording is possible for the magnetic layer having further higher Hc by making the magnetic layer thinner as described in the invention.

EXAMPLES

The present invention is explained below in detail by the following examples. The indication of "parts" means "parts by weight" in those examples.

| (1) Nonmagnetic Layer | |
| --- | --- |
| Nonmagnetic Powder α-Fe$_2$O$_3$ | 80 parts |
| Mean length of major axis | 0.1 μm |
| BET specific surface area | 48 m$^2$/g |
| pH 8, Fe$_2$O$_3$ containing amount 90% or higher | |
| DBP oil absorption | 27–38 ml/100 g |
| Surface Coating Compound Al$_2$O$_3$ | |
| Carbon black | 20 parts |
| Average primary-particle diameter | 16 mμ |
| DBP oil absorption | 80 ml/100 g |
| pH | 8.0 |
| BET specific surface area | 250 m$^2$/g |
| Volatile content | 1.5% |
| Vinyl chloride copolymer | 7 parts |
| MR-110 made by Nippon Zeon, Co., Ltd | |
| Polyester polyurethane resin | 5 parts |
| Neopentyl glycol/Caprolactonepolyol/ | |
| MDI (Diphenylmethane-4,4'-diisocyanate) = | |
| 0.9/2.6/1 | |
| Containing 1 × 10$^{-4}$ eq/g —SO$_3$Na group | |
| Butyl stearate | 1 part |
| Stearic acid | 1 part |
| Methyl ethyl ketone | 100 parts |
| Cyclohexanone | 50 parts |
| Toluene | 50 parts |
| (2) Magnetic Layer | |
| Ferromagnetic metal powder | 100 parts |
| Composition: Fe/Co = 80/20 | |
| Hc | 2300 Oe, |
| BET specific surface area | 54 m$^2$/g |
| Crystallite size | 165 Å |
| Surface Coating Compound: Al$_2$O$_3$ | |
| Particle size (major axis size) | 0.1 μm |
| Acicular ratio | 8 |
| σs | 150 emu/g |
| Vinyl chloride copolymer | 3 parts |
| MR-110 made by Nippon Zeon, Co., Ltd | |
| Polyester polyurethane resin | 5 parts |
| Neopentyl glycol/Caprolactonepolyol/ | |
| MDI (Diphenylmethane-4,4'-diisocyanate) = | |
| 0.9/2.6/1 | |
| Containing 1 × 10$^{-4}$ eq/g —SO$_3$Na group | |
| α-Alumina (particle size, 0.1 μm) | 5 parts |
| Carbon black (particle size, 0.10 μm) | 0.5 part |
| Butyl stearate | 1.5 part |
| Stearic acid | 0.5 part |
| Methyl ethyl ketone | 90 parts |
| Cyclohexanone | 30 parts |
| Toluene | 60 parts |

The above two paints were dispersed respectively using a sand mill after each component was kneaded in a continuous kneader. Polyisocyanate was added to the obtained dispersing liquids; three parts were added to the coating liquid for the nonmagnetic intermediate layer, and one part was added to the coating liquid for the magnetic layer. A mixed solvent of methyl ethyl ketone and cyclohexanone was added by 40 parts to each liquid, and each liquid was filtered using a filter having a mean pore diameter of 1 μm to prepare respective coating liquids for the nonmagnetic layer and the magnetic layer. On a polyethylenenaphthalate support having the thickness of 5.2 μm and PSD of 0.05, 0.06 and 0.09 nm$^2$ in wavelength as of 0.5, 1, and 5 μm respectively according to the roughness spectrum with an AFM, the obtained coating liquid for the nonmagnetic layer was coated in such an amount as to form the dry thickness of 1.0 μm, and immediately after this, the coating liquid for the magnetic layer was coated on the nonmagnetic layer in such an amount as to form the thickness of 0.05 μm. These layers were coated by a simultaneous multilayer coating method. While both layers were still in a wet state, the layers were subject to magnetic filed orientation created by a cobalt-Samarium magnet having a 3,000 G magnetic force and a solenoid having a 1500 G magnetic force. After dried, the layers were calendered at temperature of 90° C. by passing through seven nips, each of which comprising a pair of metal rollers to manufacture a magnetic tape, and then slitting it into an 8mm width, thereby producing an 8 mm videotape. It is properly set that the thickness of the nonmagnetic layer is 0.3 μm to 2.0 μm, and preferably, in a range of 0.5 to 1.5 μm.

(1) Hc, Residual magnetization

Measurements were made in a field of Hm 10 k Oe in use of a vibration sampling type magnetic flux meter, manufactured by Toei Kogyo Co., Ltd.

(2) C/N was measured in use of the drum tester. The head used was an MIG head having a Bs of 1.2 T, a gap length of 0.22 μm for recording and reproducing uses. An MR element having the thickness of 0.25 μm was used for the MR head for reproduction.

The head and medium during recording and reproducing had correlative speed of 10.5m/sec and recorded a single frequency signal of 21 MHz, and reproducing spectrum was observed with a spectrum analyzer manufactured by Shibasoku Co.Ltd. The C/N was the ratio of the carrier output of 21 MHz to the noise of 19 MHz.

(3) Measurement of thickness

A sampling tape was cut out in the longitudinal direction with a diamond cutter to form the thickness of about 0.1 μm, and it was observed and taken pictures by a transmission electron microscope having magnification of 100000 times; lines were drawn on the magnetic layer surface and the interface of the magnetic layer and the nonmagnetic layer; and measurement was made by the image processor IBAS2 manufactured by Zeiss Co. When the measured length was 21 cm, measurements were made 85 to 300 times, thus calculating a mean value d and a standard deviation σ.

(4) Coefficient of Kinetic Friction($\mu_K$)

The tape was lapped in the angle of 90 degrees with a stick of the SUS 303 having a roughness of 0.2 S and 2 mm φ, and it was subjected to a sliding movement of 100 passings with a load of 10 g, a velocity of 18 mm/sec, a stroke 10 mm, measuring the maximum coefficient of friction. The measurement was made under temperature at 21° C. and humidity of 50%.

TABLE 1

| | | | Ex 1 | Ex 2 | Ex. 3 | Ex. 4 | Ex. 5 |
| --- | --- | --- | --- | --- | --- | --- | --- |
| Magnetic Material | Upper Magnetic Layer | Type | Metal | Metal | Metal | Metal | BaFe |
| | | σs [emu/g] | 150 | 150 | 150 | 110 | 70 |

TABLE 1-continued

|  |  |  |  |  |  |  |  |
|---|---|---|---|---|---|---|---|
| Base | PSD | 0.5 μm | 0.05 | 0.1 | 0.03 | 0.05 | 0.05 |
|  | [nm$^2$] | 1.0 μm | 0.09 | 0.2 | 0.05 | 0.09 | 0.09 |
|  |  | 5.0 μm | 0.11 | 0.4 | 0.06 | 0.11 | 0.11 |
| Magnetic Surface | PSD [nm$^2$] | 0.5 μm | 0.06 | 0.15 | 0.04 | 0.08 | 0.06 |
|  |  | 1.0 μm | 0.1 | 0.2 | 0.06 | 0.1 | 0.13 |
|  |  | 5.0 μm | 0.13 | 0.45 | 0.08 | 0.11 | 0.16 |
| Binder Amount [Parts by weight] | Magnetic Upper Layer | Vinyl chloride | 3 | 3 | 3 | 3 | 3 |
|  |  | Urethane | 5 | 5 | 5 | 5 | 5 |
|  |  | Hardening agent | 1 | 1 | 1 | 1 | 1 |
|  |  | Total | 9 | 9 | 9 | 9 | 9 |
|  | Nonmagnetic layer | Vinyl chloride | 7 | 7 | 7 | 7 | 7 |
|  |  | Urethane | 5 | 5 | 5 | 5 | 5 |
|  |  | Setting agent | 3 | 3 | 3 | 3 | 3 |
|  |  | Total | 15 | 15 | 15 | 15 | 15 |
|  | B (U)/B (L) |  | 0.6 | 0.6 | 0.6 | 0.6 | 0.6 |
| Thickness | d | [μm] | 0.05 | 0.08 | 0.02 | 0.05 | 0.05 |
|  | σ |  | 0.01 | 0.02 | 0.006 | 0.008 | 0.008 |
|  | σ/d |  | 0.2 | 0.25 | 0.3 | 0.16 | 0.16 |
| Medium Magnetic Properties | Hc [Oe] |  | 2350 | 2350 | 2350 | 2470 | 2700 |
|  | φr [emu/cm$^2$] |  | 0.02333 | 0.037 | 0.0092 | 0.017 | 0.011 |
| Evaluation And Results | Inductive reproduction | C/N [dB] | 3.8 | 2.3 | 1.8 | 2.1 | 3.5 |
|  |  | output [dB] | 1.2 | 1.5 | 0.3 | 0.5 | 2.3 |
|  | MR Reproduction | C/N [dB] | 4.8 | 2.6 | 5.2 | 5.8 | 6.3 |
|  |  | Output [dB] | 1.4 | 1.1 | 0.2 | 0.8 | 0.6 |
|  | $\mu_K$ |  | 0.26 | 0.22 | 0.29 | 0.25 | 0.26 |

|  |  |  | Ex. 6 | Ex. 7 | Comp. Ex. 1 | Comp. Ex. 2 | Comp. Ex. 3 |
|---|---|---|---|---|---|---|---|
| Magnetic Material | Upper Magnetic Layer | Type | Metal | Metal | Metal | Metal | Metal |
|  |  | σs [emu/g] | 150 | 130 | 150 | 150 | 150 |
| Base | PSD [nm$^2$] | 0.5 μm | 0.05 | 0.05 | 0.1 | 0.005 | 0.1 |
|  |  | 1.0 μm | 0.09 | 0.09 | 0.6 | 0.02 | 0.6 |
|  |  | 5.0 μm | 0.11 | 0.12 | 1.1 | 0.05 | 1.1 |
| Magnetic Surface | PSD [nm$^2$] | 0.5 μm | 0.08 | 0.06 | 0.2 | 0.009 | 0.18 |
|  |  | 1.0 μm | 0.09 | 0.1 | 0.8 | 0.04 | 0.76 |
|  |  | 5.0 μm | 0.16 | 0.14 | 1.5 | 0.06 | 1.4 |
| Binder Amount [Parts by weight] | magnetic upper layer | Vinyl chloride | 3 | 3 | 12 | 3 | 3 |
|  |  | Urethane | 5 | 5 | 3 | 5 | 5 |
|  |  | Hardening agent | 1 | 1 | 3 | 1 | 1 |
|  |  | Total | 9 | 9 | 18 | 9 | 9 |
|  | nonmagnetic layer | Vinyl chloride | 12 | 7 | 12 | 7 | 7 |
|  |  | Urethane | 5 | 5 | 5 | 5 | 5 |
|  |  | Setting agent | 5 | 3 | 1 | 3 | 3 |
|  |  | Total | 22 | 15 | 18 | 15 | 15 |
|  | B (U)/B (L) |  | 0.4 | 0.6 | 1 | 0.6 | 0.6 |
| Thickness | d | [μm] | 0.05 | 0.05 | 0.28 | 0.12 | 0.05 |
|  | σ |  | 0.01 | 0.008 | 0.08 | 0.02 | 0.01 |
|  | σ/d |  | 0.2 | 0.16 | 0.29 | 0.17 | 0.2 |
| Medium Magnetic Properties | Hc [Oe] |  | 2350 | 1800 | 2350 | 2350 | 2350 |
|  | φr [emu/cm$^2$] |  | 0.016 | 0.02 | 0.13 | 0.055 | 0.0233 |
| Evaluation And Results | Inductive Reproduction | C/N [dB] | 2.5 | 2.9 | 0 | 4.3 | 0.6 |
|  |  | Output [dB] | 0.7 | 0.3 | 0 | 2.5 | 0.8 |
|  | MR Reproduction | C/N [dB] | 2.4 | 2.5 | 0 | 1.2 | 0.3 |
|  |  | Output [dB] | 0.7 | 0.8 | 0 | 2.8 | 0.9 |
|  | $\mu_K$ |  | 0.21 | 0.26 | 0.24 | Not Measurable | 0.23 |

EXPLANATION OF EXAMPLES AND COMPARATIVE EXAMPLES

A Comparative Example 1 was set as a standard (0dB) for electromagnetic characteristics.

Example 1 was a standard sample produced by the prescription mentioned above, having higher output and C/N than those of Comparative Example 1.

Example 2 was a sample using a support having roughness strength around the upper limit as well as a magnetic layer thickness around the upper limit. Example 2 had a lower C/N than that of Example 1.

Example 3 was a sample using a support having roughness strength around the lower limit as well as a magnetic layer thickness around the lower limit. Example 3 had a higher coefficient of friction than that of Example 1.

Example 4 was the same sample as Example 1, but changed σ of the magnetic material to be 110 emu/g. Example 4 had a lower C/N in the case of the inductive head and a higher C/N in the case of the MR head in comparison with Example 1.

Example 5 was the same sample as Example 1, but used the magnetic material having the Hc of 2600 Oe, plate size of 0.06 μm, and thickness of 0.01 μm with use of Ba ferrite having σs of 70 emu/g. Example 5. showed a high C/N in both cases of the inductive head and the MR head.

Example 6 was a sample with the larger amount of the nonmagnetic layer binders than that of Example 1. The filling degree of the magnetic layer was lowered, having a lower output and a C/N in comparison with Example 1.

Example 7 was the same sample as Example 1, but used the magnetic material having Hc of 1750 Oe and σs of 130 emu/g. Example 7 had a lower C/N than that of Example 1 in the case of the inductive head, but substantially the same C/N in the case of the MR head.

Comparative Example 2 was a sample having a base that was too smooth. Comparative Example 2 was excelling in C/N, but the coefficient of friction could not be measured.

Comparative Example 3 was a sample having only the same surface roughness of the support with Comparative Example 1.

In FIG. 1, shown is a relation between the roughness strength of the magnetic layer surface and wavelength of the magnetic tapes used in Example 1, Example 2 and Comparative Example 1.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by claims set forth below.

What is claimed is:

1. A magnetic recording medium comprising:
   a flexible nonmagnetic support;
   a nonmagnetic layer containing a nonmagnetic powder and a binder formed on the flexible nonmagnetic support; and
   a magnetic layer containing a ferromagnetic powder and a binder formed on the nonmagnetic layer, the magnetic layer having an average thickness d of 0.01 μm to 0.3 μm, a ratio σ/d of a standard deviation σ of the thickness of the magnetic layer to the average thickness d being 0.5 or less, and
   wherein a surface roughness spectrum, measured with an atomic force microscope, on the magnetic layer side of the flexible nonmagnetic support has a Power Spectrum Density of Roughness of 0.5 nm$^2$ or less in a wavelength of 1 μm to 5 μm and a Power Spectrum Density of Roughness of 0.02 nm$^2$ to 0.5 nm$^2$ in a wavelength of 0.5 μm or more to less than 1 μm.

2. The magnetic recording medium according to claim 1, wherein binder weight B(L) of the nonmagnetic layer is 25 or lower parts by weight with respect to 100 parts by weight of the nonmagnetic powder, and the ratio of the B(L) to binder weight B(U) of the magnetic layer is $0.1 \leq B(U)/B(L) \leq 1.0$.

3. The magnetic recording medium according to claim 1, wherein a coercive force Hc in an in-plate direction of the magnetic layer is from 1500 Oe or more to 4000 Oe or less and residual magnetization in an in-plane direction per 1 cm$^2$ of the magnetice layer is from 0.0005 emu to 0.005 emu.

4. A method of reproducing magnetic signal recorded in a magnetic recording medium comprising detecting said magnetic signal with a magnetoresistive head, wherein said magnetic recording medium comprises
   a flexible nonmagnetic support;
   a nonmagnetic layer containing a nonmagnetic powder and a binder formed on the flexible nonmagnetic support; and
   a magnetic layer containing a ferromagnetic powder and a binder formed on the nonmagnetic layer, the magnetic layer having an average thickness d of 0.01 μm to 0.3 μm, a ratio σ/d of a standard deviation σ of the thickness of the magnetic layer to the average thickness d being 0.5 or less, and
   wherein a surface roughness spectrum, measured with an atomic force microscope, on the magnetic layer side of the flexible nonmagnetic support has a Power Spectrum Density of Roughness of 0.5 nm$^2$ or less in a wavelength of 1 μm to 5 μm and a Power Spectrum Density of Roughness of 0.02 nm$^2$ to 0.5 nm$^2$ in a wavelength of 0.5 μm or more to less than 1 μm.

5. A method of claim 4, wherein binder weight B(L) of the nonmagnetic layer is 25 or lower parts by weight with respect to 100 parts by weight of the nonmagnetic powder, and the ratio of the B(L) to binder weight B(U) of the magnetic layer is $0.1 \leq B(U)/B(L) \leq 1.0$.

6. The method of claim 4, wherein a coercive for Hc in an in-plate direction of the magnetic layer is from 1500 Oe or more to 4000 Oe or less and residual magnetization in an in-plane direction per 1 cm$^2$ of the magnetic layer is from 0.0005 emu to 0.005 emu.

* * * * *